United States Patent [19]

Zardi et al.

[11] Patent Number: 4,935,210
[45] Date of Patent: Jun. 19, 1990

[54] SYSTEM FOR REDUCING ENERGY CONSUMPTION IN MULTI-UNIT REACTORS FOR HETEROGENEOUS SYNTHESIS AND RELATED REACTORS

[75] Inventors: Umberto Zardi, Via Lucino 57, CH - 6932 Breganzona, Switzerland; Giorgio Pagani, Lugano, Switzerland

[73] Assignees: Ammonia Casale S.A.; Umberto Zardi, Switzerland

[21] Appl. No.: 116,558

[22] Filed: Nov. 3, 1987

[30] Foreign Application Priority Data

Nov. 3, 1986 [CH] Switzerland ............... 04335/86

[51] Int. Cl.⁵ .................. B01T 8/04; C01C 1/04
[52] U.S. Cl. .................. 422/148; 29/428; 422/192; 422/198; 423/361
[58] Field of Search .......... 422/148, 192, 198; 423/361; 29/428

[56] References Cited

U.S. PATENT DOCUMENTS 4,554,135  11/1985  Grotz et al. ................ 422/148
4,755,362  7/1988   Zardi ........................ 422/148

Primary Examiner—Barry S. Richman
Assistant Examiner—Jill Johnston

Attorney, Agent, or Firm—Ostrolenk, Faber, Gerb & Soffen

[57] ABSTRACT

A reactor for heterogeneous synthesis with reduced energy consumption. The reactor includes two cylindrical walls that are at least partly perforated and which annularly deliminate the catalytic beds. An outer wall (Fe) has height (Hi) and a diameter (Di) that is slightly smaller than diameter (Dc) of cartridge (C). An internal, cylindrical wall (Fi) has a height (H'i) and a diameter (D'i) much smaller than diameter (Di). The diameter (D'i) is about equal to diameter (Dt) of a central tube (T) which is an outlet for reacted gas (RG). The top of the cylindrical wall (Fi) is closed by a cover (CO) and is located at a distance (D) from the upper edge of the external wall of the basket (Fe). The basket is closed at its bottom by a tapered wall (PR). The catalytic bed is therefore shaped in three distinct arrangements: first, an annular shaped portion having a diameter (Di−D'i) for the height (Hi−D); second, a substantially full cylinder portion along height (D); and third, a portion having a tapered outside shape and an internal cylindrical shaped cavity, this portion having a widest diameter (Di) and height (Hl−Hi=Hi''). Reacted gas collects in an area (Q) inside perforated cylindrical wall (Fi).

3 Claims, 2 Drawing Sheets

SYSTEM FOR REDUCING ENERGY CONSUMPTION IN MULTI-UNIT REACTORS FOR HETEROGENEOUS SYNTHESIS AND RELATED REACTORS

BACKGROUND OF THE INVENTION

1. Field of the Invention

This invention concerns a system for increasing conversion yields and reducing energy consumption in multiunit reactors for heterogeneous synthesis and more particularly for the synthesis of ammonia, each unit consisting of an outer shell (P), and of an internal cartridge (C) with a diameter (Dc) and total height (H1), and containing a catalyst in granules arranged in a catalytic bed (K) with axial height (H1) and situated between a cylindrical external wall with diameter (Di) and height (Hi) and an inner cylindrical wall with diameter (D'i) (smaller than Di), and height H'i, inside which the gas, the upper traverse face of the bed being open and penetrated axially by the synthesis gas.

2. Description of the Related Art:

It is well known that reactors for catalytic synthesis under pressure, and more particularly for the catalytic synthesis of ammonia, methanol, higher alcohols, etc., consist of an outer shell and of a single unit or of several units according to the C. F. Braun process, each unit having an internal cartridge containing a catalyst in granules in various shapes and with various characteristics arranged in one or more layers (catalytic beds). In reactors according to the C. F. Braun process each unit has a single-layer catalytic bed.

The synthesis gas running through the various catalytic beds is generally cooled between one bed and the next, these being exothermic reactions, in order to achieve optimal temperature conditions in the various catalytic beds by injecting fresh gas (quench reactor) or by direct interchange with the cold incoming gas. Said cooling is carried out in heat exchangers arranged outside and amongst the several units of the reactor where the C. F. Braun process is concerned.

Reactors featuring radial gas flow in the catalytic beds have recently been put forward (Lummus, Topsoe, Kellogg, U.S. Pat. Nos. 3918918 and 4181701, European Patent Appl. No. 007743-A1) or featuring axial-radial flow (Ammonia Casale U.S. Pat. Nos. 4372920 and 4405562) which represent a considerable progress when compared to axial flow reactors (including the C. F. Braun reactor), particularly when it is necessary to use large quantities of catalyst, as they reduce pressure drop in the catalytic beds and thus energy consumption. In these instances the axial gas flow requires wide reactors (low length-diameter ratio of the apparatus) with high equipment costs and high energy consumption.

Ammonia Casale U.S. Pat. Nos. 4372920 and 4405562 have made it possible greatly to simplify cartridge design in synthesis reactors, achieving an internal reactor structure easily accessible for maintenance and to load and unload the catalyst with, at the same time, low pressure drop. According to the above mentioned patents, in effect, each catalytic bed consists of a perforated cylindrical external wall, a perforated cylindrical internal wall and only one sealed end (the upper wall of the basket being, in effect, fully open); and upper unperforated portion of said internal cylindrical wall (or of both cylindrical walls), together with the section of open passage situated between the upper edges of the two cylindrical walls arranged on a level approximately perpendicular to the longitudinal axis of said perforated walls, constituting the passage where a minor portion of gas runs through the catalytic bed with a prevalently axial flow, while the remaining major portion of gas runs with radial flow through the major portion of catalytic bed arranged in the perforated area of the two cylindrical walls of the bed.

According to the above invention the portion of gas running through the bed with a prevalently axial flow is controlled by the height of the portion of unperforated internal cylindrical wall (or both internal and external) which in any case according to a prevalent characteristic of the invention is a minor portion of the total height of the wall itself. Reactors with dimensions equal to a height/diameter ratio greater than 10 (i.e., with a diameter/height ratio smaller than 0.1) are preferably to be produced according to the above invention.

In the current economic world situation modernisation of existing plants is becoming increasingly important: the majority of such plants where a synthesis process is concerned (for example of the synthesis of ammonia) uses reactors with the gas flowing axially through the catalytic beds (axial reactors) characterised by a low height/diameter ratio of the reactor, owing to the above mentioned need to contain pressure drops in the reactor. In the case of C. F. Braun reactors consisting of several units each with a low height/diameter ratio and each containing a single catalytic bed, the same applies as mentioned above not only for existing reactors but also for the new reactors planned by C. F. Braun with two or more units still according to the above criterion.

In previous Patent Applications, more particularly in European Patent Application No. 86104911.2, the Applicants have already described a system for the reduction of energy consumption in reactors for heterogeneous catalytic synthesis under pressure and more particularly in reactors with dimensions equal to a low height/diameter ratio (less than 10); it is in particular a system suitable for revamping existent axial gas flow reactors, and more particularly Kellogg reactors, used in a great number of high capacity plants (800÷1500 t/d) built towards the end of the Seventies.

In another Patent Application the Applications described a system for revamping "Chemico" axial reactors.

All the above plants using axial reactors are characterised by the high energy consumption not critical in those years when it was available at a low cost, since the axial-type reactor is one of the reasons for high energy consumption.

While continuing their researches the Applicants found a system which can now be easily applied for the modernisation of other axial reactors and more particularly C. F. Braun reactors, whether already in existence or newly built.

SUMMARY OF THE INVENTION

The invention, therefore, concerns a system as described in the introductory part of the description and of the main claim, characterised by the fact that the catalytic bed is delimited by:

(a) (inside and in the vicinity of said outer wall forming cartridge (C)), by a cylindrical outer wall (Fe) with diameter (Di) permeable by gas for at least the major portion of its height (Hi), (Di) being only slightly smaller than the diameter of cartridge (C):

(b) an internal cylindrical wall (Fi) also permeable by gas for at least the major portion of its height (H'i) with a diameter (D'i) much smaller than the above mentioned (Di) of (Fe) and of the same order of magnitude of diameter (Dt) of the central tube (T) which is the outlet for the reacted gas, the top (SO) of (Fi) being closed by a cover (CO) possibly permeable by gas at least in part and with a distance (D) from the top (SE) of the external wall (Fe):

(c) a lower wall (PR) with the height (H"i) along which its diameter (D") decreases towards the bottom, beginning from diameter (Dc) of the cartridge to diameter (D'i) of the internal cylindrical wall;

the catalytic bed consists therefore of a first solid upper cylindrical area with diameter (Di) and height (D): of a second annular area with diameter (Di−D'i) and height (Hi−D); and a third tapered area with height (H"i=H1−Hi) and diameters decreasing from (Di) to (D'i).

The ratio of the gas portions (with a prevalently axial flow and radial flow) will be different in the catalytic beds of the various units where these have a variable height (variable height/diameter ratio of the baskets), as in the application of this invention to modify the above mentioned C. F. Braun reactors, in which the height (Hi) of the internal cartridge's catalytic beds could increase in the various beds in cascade arrangement (2-3 beds each with its own shell).

DETAILED DESCRIPTION OF THE PREFERRED EMBODIMENTS

Figure 1:
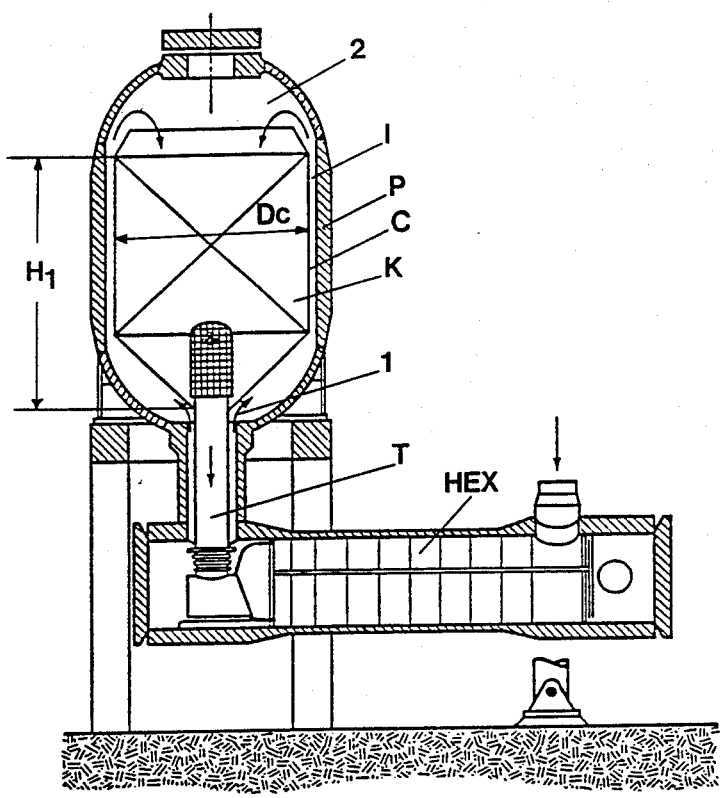
FIG. 1 shows a conventional C. J. Braun ammonia reactor.
Figure 2:
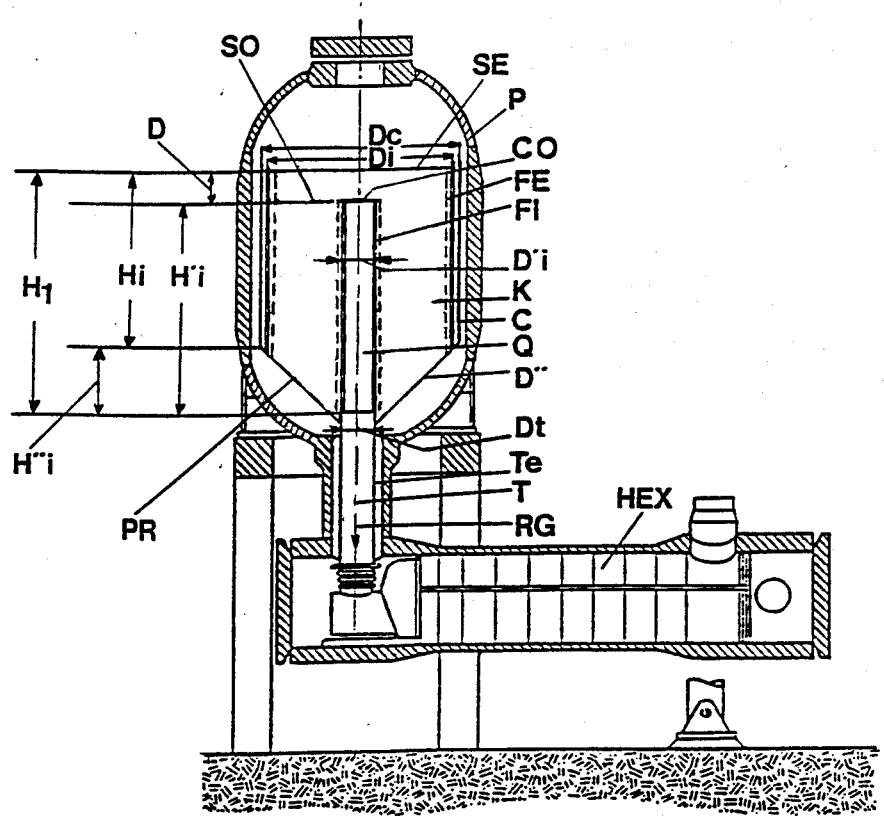
FIG. 2 shows the same reactor modified in accordance with the invention.

The various aspects and advantages of the invention will become more apparent from the following descriptions of the embodiment shown in FIG. 2, opposite the known technique shown in FIG. 1, these illustrations being a schematic view of a longitudinal cross-section. More particularly the following description of a preferred embodiment (modification of the axial-flow C. F. Braun reactor) will better illustrate the features of the invention.

The embodiment described refers (as preference but not as limitation) to the modification of a C. F. Braun ammonia reactor with several catalytic beds (for example three) through which runs the gas with an axial flow, and cooling of the gas outside the beds (reactor shown by way of example in FIG. 1 of the paper "New Synloop Lower Ammonia Production Costs" by Wilson, Grotz & Richez, pages 63-79, presented at the British Sulphur Conference in Amsterdam in April 1986).

The reaction gas (see FIG. 1) enters from the bottom of the reactor in 1 and rises in the airspace (I) between shell (P) and cartridge (C), and enters (flow 2) axially from top to bottom the catalytic bed (K). The reacted gas reaches outlet tube (T) which feeds the heat exchanger (HEX) outside shell (P).

FIG. 2 shows the system according to the invention, in which the catalytic bed is now delimited by:

(a) inside and in the vicinity of said outer wall forming cartridge (C) ), by a cylindrical outer wall (Fe) with diameter (Di) permeable by gas for at least the major portion of its height (Hi), (Di) being only slightly smaller than the diameter of cartridge (C);

(b) an internal cylindrical wall (Fi) also permeable by gas for at least the major portion of its height (H'i) with a diameter (D'i) much smaller than the above mentioned (Di) of (Fe) and of the same order of magnitude of diameter (Dt) of the central tube (T) which is the outlet for the reacted gas, the top (SO) of (Fi) being closed by a cover (CO) possibly permeable by gas at least in part and with a distance (D) from the top (SE) of the external wall (Fe);

(c) a lower wall (PR) with height (H"i) along which its diameter (D") decreases towards the bottom, beginning from diameter (Dc) of the cartridge to diameter (D'i) of the internal cylindrical wall.

The catalytic bed consists therefore of a first solid upper cylindrical area with diameter (Di) and height (D); of a second annular area with diameter (Di−D'i) and height (Hi−D); and of a third tapered area with height (H"i=H1−Hi) and diameters decreasing from (Di) to (D'i).

The following comparative example better illustrates the advantages of the invention.

COMPARATIVE EXAMPLE

| Basic synthesis data by C. F. Braun | |
| --- | --- |
| Capacity | 1360 MTD ammonia |
| Pressure at reactor's inlet | 210 bar |
| Gas composition at reactor's inlet | |
| H2       69.00% mol | |
| N2       23.00% mol | |
| Ar + CH4  5.00% mol | |
| NH3       3.00% mol | |
| C. F. Braun two-bed reactor | |
| Diameter 1st bed | about 3000 mm |
| Diameter 2nd bed | about 3300 mm |
| Catalyst volume (6 ÷ 10 mm) | |
| 1st bed | 20 m3 |
| 2nd bed | 53 m3 |
| C. F. Braun two-bed reactor modified with axial-radial beds according to the invention | |
| Diameter 1st bed | about 3000 mm |
| Diameter 2nd bed | about 3300 mm |
| Catalyst volume (1.5 ÷ 3 mm) | |
| 1st bed | 17.4 m3 |
| 2nd bed | 50.2 m3 |

These figures are for a modified reactor already in existence. For new reactors, an optimised L/D ratio would be taken into consideration.

| Reactor performance | C. F. Braun Conventional | C. F. Braun with axial-radial internals |
| --- | --- | --- |
| NH3 content at reactor's outlet | 17% mol | 20.6% mol |
| ΔP reactor | — | 2 bar reduction |

CONCLUSIONS

The improvements that can be achieved with axial-radial internals can be summed up as follows:
Higher concentration of NH3 at reactor's outlet
Reduction of circulation flow (about 20%)
Reduction in loop pressure drop (about 35%)
Reduction in refrigeration units (about 20%).

The above applies to modified existing reactors. Where new reactors are concerned, the dimensions of catalyst volume (with two or three beds) and of the reactors (L/D ratio) can be optimised, with maximum yield and minimal investment, thus achieving even better results.

We claim:

1. A system for increasing conversion yields and reducing energy consumption in multi-unit reactors for heterogeneous synthesis and more particularly for the synthesis of ammonia, each reaction unit consisting of an outer shell (P) and of a cartridge (C) containing a catalyst in granules arranged in a catalytic bed (K) with axial height (H1) and situated between a cylindrical external wall with diameter (Di) and height (Hi), and an inner cylindrical wall with diameter (D'i) which is smaller than Di, the inner cylindrical wall having a height (H'i), inside of which the reacted gas is collected, and a tapered bottom (PR), the upper traverse face of said bed being open and penetrated axially by the synthesis gas, wherein the improvement comprises said catalytic bed being delimited by:

(a) a cylindrical outer wall (Fe) located inside and in the vicinity of said outer wall forming cartridge (C), the cylindrical outer wall (Fe) having diameter (Di) permeable by gas for at least the major portion of its height (Hi), (Di) being only slightly smaller than the diameter of cartridge (C);

(b) an internal cylindrical wall (Fi) also permeable by gas for at least the major portion of its height (H'i) with a diameter (D'i) much smaller than the diameter (Di) of (Fe) and of the same order of magnitude of diameter (Dt) of the central tube (T) which is the outlet for the reacted gas, the top (SO) of (Fi) being closed by a cover (CO) up to partially permeable by gas and with a distance (D) from the top (SE) of the external wall (Fe);

(c) a lower wall (PR) with the height (H"i) along which its diameter (D") decreases towards the bottom starting from the diameter (Dc) of the cartridge towards diameter (D'i) of the internal cylindrical wall, the catalytic bed consisting therefore of: I a solid upper cylindrical area with diameter (Di) and height (D); II an annular area with diameter (Di−D'i) and height (Hi−D); and III a tapered area with height (H"i=H1−Hi) and diameter decreasing from (Di) to (D'i).

2. The system as in claim 1, wherein the reaction gas runs through the I area with a prevalently axial flow, the II area with a prevalently radial flow and the III area with a mixed flow.

3. The system as in claim 1, wherein within the same reactor the said flows can be adjusted by varying the ratio between heights Hi, H'i, H"i and Di.

* * * * *